US011901138B2

(12) United States Patent
Bailey et al.

(10) Patent No.: US 11,901,138 B2
(45) Date of Patent: Feb. 13, 2024

(54) REMOTE CONTROLLED LIGHT SWITCH COVER

(71) Applicant: ECOLINK INTELLIGENT TECHNOLOGY, INC., Carlsbad, CA (US)

(72) Inventors: Michael Bailey, Carlsbad, CA (US); Eric Wang, Tainan (TW); Jerry Huang, Tainan (TW)

(73) Assignee: ECOLINK INTELLIGENT TECHNOLOGY, INC., Carlsbad, CA (US)

( * ) Notice: Subject to any disclaimer, the term of this patent is extended or adjusted under 35 U.S.C. 154(b) by 318 days.

(21) Appl. No.: 17/340,610

(22) Filed: Jun. 7, 2021

(65) Prior Publication Data

US 2021/0296067 A1 Sep. 23, 2021

Related U.S. Application Data

(60) Division of application No. 16/812,936, filed on Mar. 9, 2020, now Pat. No. 11,031,197, which is a division (Continued)

(51) Int. Cl.

| | |
|---|---|
| ***H01H 3/42*** | (2006.01) |
| ***H01H 23/04*** | (2006.01) |
| ***H01H 23/14*** | (2006.01) |

(52) U.S. Cl.

CPC .......... *H01H 23/04* (2013.01); *H01H 23/145* (2013.01); *H01H 2300/03* (2013.01)

(58) Field of Classification Search

None

See application file for complete search history.

(56) References Cited

U.S. PATENT DOCUMENTS 4,131,776 A 12/1978 Ehrenberger
4,912,376 A 3/1990 Strick (Continued)

FOREIGN PATENT DOCUMENTS

DE 3028812 A1 2/1982
EP 0473244 A2 3/1992

OTHER PUBLICATIONS

Office Action from EP application No. 16884174.0 dated Aug. 8, 2022, 4 pp.

(Continued)

*Primary Examiner* — Jared Fureman
*Assistant Examiner* — Esayas G Yeshaw
(74) *Attorney, Agent, or Firm* — Greenberg Traurig, LLP

(57) ABSTRACT

A light switch cover for converting a standard toggle switch into a remote-controlled toggle switch. In one embodiment, the light switch cover comprises a switch toggle member for acting upon a toggle light switch member to place the toggle light switch member into either an on position or an off position, a gear train coupled to the switch toggle member that causes the switch toggle member to act upon the toggle light switch member, an electric motor, coupled to the gear train, for driving the gear train in a first direction to cause the switch toggle member to place the toggle light switch member into the on position, and for driving the gear train in a second direction to cause the switch toggle member to place the toggle light switch member into the off position, motor driving circuitry coupled to the electric motor, a receiver for receiving signals that cause actuation of the standard toggle switch, and processing circuitry coupled to the receiver and the motor driving circuitry that causes the light switch cover to receive a signal to turn the toggle switch into the on position and, in response, causing the electric motor to rotate in a direction to cause the switch (Continued)

toggle member to place the toggle light switch member into the on position.

22 Claims, 10 Drawing Sheets

Related U.S. Application Data of application No. 15/963,462, filed on Apr. 26, 2018, now Pat. No. 10,586,666, which is a division of application No. 14/988,642, filed on Jan. 5, 2016, now Pat. No. 9,959,997, which is a continuation-in-part of application No. 14/825,117, filed on Aug. 12, 2015, now Pat. No. 9,799,469.

(60) Provisional application No. 62/036,581, filed on Aug. 12, 2014.

(56) References Cited

U.S. PATENT DOCUMENTS

| | | | | |
|---|---|---|---|---|
| 5,458,311 | A | 10/1995 | Holbrook | |
| 5,693,923 | A | 12/1997 | Gula et al. | |
| 5,955,796 | A | 9/1999 | Nilssen | |
| 8,084,700 | B1 | 12/2011 | Massaro et al. | |
| 8,669,484 | B1 | 3/2014 | Benson | |
| 9,418,802 | B2 | 8/2016 | Romano et al. | |
| 9,520,247 | B1 | 12/2016 | Finnegan et al. | |
| 9,959,997 | B2 | 5/2018 | Bailey et al. | |
| 11,515,827 | B2 * | 11/2022 | Altonen | B60L 50/51 |
| 11,610,748 | B2 * | 3/2023 | Shivell | H05B 47/19 |
| 11,636,754 | B2 * | 4/2023 | Dimberg | G08C 17/02<br>340/12.5 |
| 2004/0074747 | A1 | 4/2004 | Komatsu et al. | |
| 2005/0016825 | A1 | 1/2005 | Andres et al. | |
| 2005/0082150 | A1 | 4/2005 | Gray, Jr. | |
| 2005/0194243 | A1 | 9/2005 | Prineppi | |
| 2009/0288937 | A1 | 11/2009 | Agronin et al. | |
| 2012/0292174 | A1 | 11/2012 | Mah et al. | |
| 2013/0342029 | A1 | 12/2013 | Mans | |
| 2015/0228426 | A1 | 8/2015 | Romano et al. | |
| 2016/0049267 | A1 | 2/2016 | Bailey | |

OTHER PUBLICATIONS

ISA/US, International Search Report and Written Opinion issued on PCT application No. US16/66964, dated Mar. 27, 2017, 11 pgs.

ISA/US, International Search Report and Written Opinion issued on PCT application No. US17/66587, dated Mar. 7, 2018, 11 pgs.

EPO, extended European search report issued on EP patent application No. 16884174.0, dated Jul. 3, 2019, 7 pgs,.

European Patent Office, Examination report issued on European patent application No. 16884174.0, dated Aug. 12, 2020, 4 pgs.

* cited by examiner

REMOTE CONTROLLED LIGHT SWITCH COVER

CROSS-REFERENCE TO RELATED APPLICATIONS

The present application is a divisional of U.S. patent application Ser. No. 16/812,936, filed on Mar. 9, 2020, which is a divisional of U.S. patent application Ser. No. 15/963,462, filed on Apr. 26, 2018, which is a divisional of U.S. patent application Ser. No. 14/988,642, filed on Jan. 5, 2016, which is a continuation-in-part of U.S. patent application Ser. No. 14/825,117 filed on Aug. 12, 2015, now U.S. Pat. No. 9,799,469, which claims the benefit of U.S. Provisional Application No. 62/036,581, filed on Aug. 12, 2014, the entirety of all incorporated by reference herein.

BACKGROUND

Field of Use

The present application relates generally to the home automation and control arts. More specifically, embodiments of the present invention relate to remote control of electrical devices.

Description of the Related Art

Home automation and control has been gaining popularity in recent years, allowing homeowners to remotely monitor and control various devices in their home. For example, the Nest thermostat has revolutionized the home thermostat market by intelligently learning the usage habits of home occupants, while also allowing remote control of the thermostat via the Internet. Wi-Fi enabled light bulbs are becoming increasingly common, allowing remote control of lights. A variety of other remote control devices are available, including devices that open/close garage doors, turn on/off pool/spa equipment, turn on/off sprinkler systems, etc.

The popularity of being able to control lighting is of particular interest to many consumers. However, it is generally necessary to purchase expensive equipment to enable such a feature, such as expensive Wi-Fi capable light bulbs, or Wi-Fi enabled light switches. Such Wi-Fi enabled light switches typically require replacement of the entire light switch, which potentially requires access to household AC voltages. Understandably, many homeowners are incapable or unwilling to perform such re-wiring.

It would be desirable, therefore, to enable homeowners to retrofit their existing electrical switches in order to add remote control capabilities to turn lights and other electrical devices on and off without having to purchase expensive lighting equipment or having to replace entire light switches.

SUMMARY

The embodiments described herein relate to apparatus, systems, and methods for converting a standard toggle switch into a remote controlled toggle switch using an inventive switch cover. In one embodiment, the switch cover comprises a switch toggle member for acting upon a toggle light switch member to place the toggle light switch member into either an on position or an off position, a gear train coupled to the switch toggle member that causes the switch toggle member to act upon the toggle light switch member, an electric motor, coupled to the gear train, for driving the gear train in a first direction to cause the switch toggle member to place the toggle light switch member into the on position, and for driving the gear train in a second direction to cause the switch toggle member to place the toggle light switch member into the off position, motor driving circuitry coupled to the electric motor, a receiver for receiving signals that cause actuation of the standard toggle switch, and processing circuitry coupled to the receiver and the motor driving circuitry that causes the light switch cover to receive a signal to turn the toggle switch into the on position and, in response, causing the electric motor to rotate in a direction to cause the switch toggle member to place the toggle light switch member into the on position.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention allow a conventional electrical switch to be converted into a remote-controlled switch simply and economically. In one embodiment, a conventional toggle switch is converted into a remote-controlled switch by simply replacing its switch cover with a switch cover in accordance with the teachings herein.

A remote controlled switch cover assembly may be used to convert a standard, existing toggle switch to one that can be controlled remotely, for example wirelessly using a keyfob or by using a smartphone, tablet, or other personal electronic device through via a local gateway device, or via the Internet and a local gateway device, in instances where the controller is located remotely from the toggle switch. In some embodiments, a remote controlled switch may be controlled via a local security panel or home automation gateway, either alone or in conjunction with the aforementioned wireless devices. In one embodiment, the remote controlled switch cover assembly is used in conjunction with a standard toggle switch used to apply and remove household AC voltages to electrical devices such as lights or other common household appliances or devices.

Figure 1:
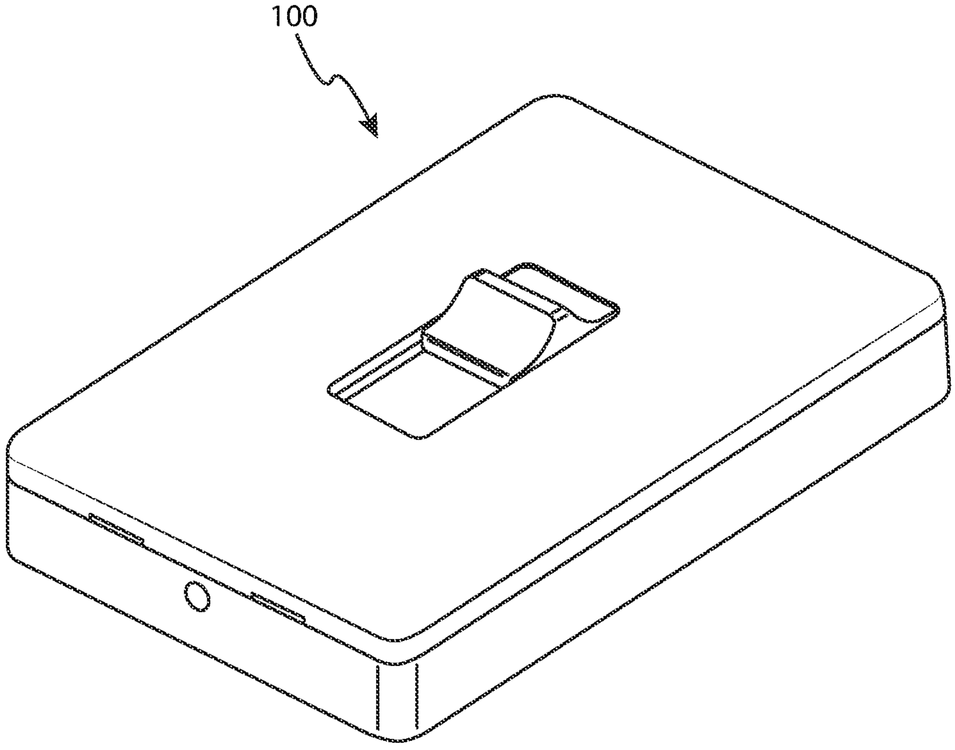
FIG. 1 is a perspective view of one embodiment of a remote controlled switch cover assembly, for use with a standard toggle switch.

FIG. 1 is a perspective view of one embodiment of a remote controlled switch cover assembly 100, for use with a standard toggle switch commonly found in homes and businesses to apply and remove power to lights or other common appliances or devices. Remote controlled switch cover assembly 100 in one embodiment is approximately 20 millimeters thick, 76 millimeters wide, and 114 millimeters long, as shown. It is designed to be placed over an existing toggle switch after its switch cover has been removed. This allows an easy retrofit to convert an existing toggle switch into a remote-controlled toggle switch, while still allowing the existing toggle switch to be operated manually.

Figure 2:
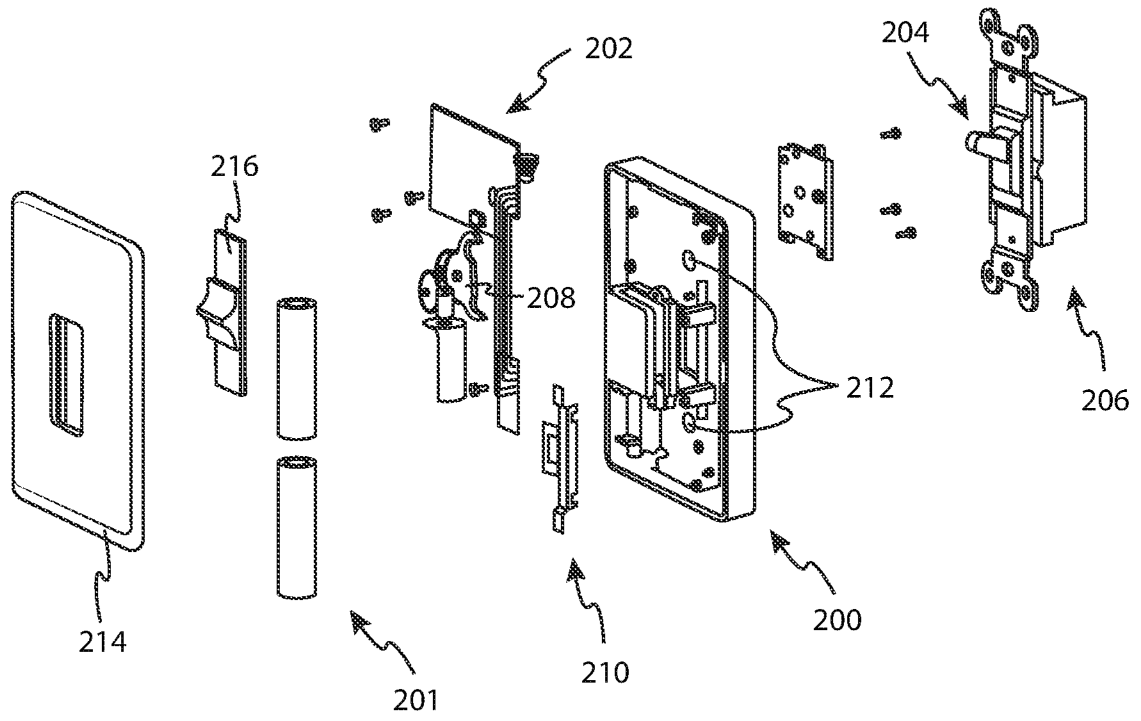
FIG. 2 shows an exploded view of one embodiment of the remote controlled switch cover assembly of FIG. 1.

FIG. 2 shows an exploded view of one embodiment of remote controlled switch cover assembly 100. It comprises a main body 200 that holds one or more batteries 201 (in this case 2 AA batteries) for providing power to electronics 202 located on or within main body 200, such as such as a receiver for receiving wireless signals to operate remote controlled light switch assembly 100, i.e., commands to move a toggle light switch member 204 of an existing, standard toggle switch assembly 206 from "on" to "off" or vice versa, a switch toggle member 208 for manipulation of toggle light switch member 204, and a switch position member 210 for providing an indication of the position of toggle light switch member 204, e.g., "on" or "off", "up" or "down", "1" or "0", etc. Main body 200 is installed over an existing toggle switch after its switch cover has been removed. The same switch cover used to cover the existing switch may be used to cover the main body, or a custom switch cover 214 may be used to fit the dimensions of the main body. In one embodiment, two holes 212 are formed through a surface of the main body 200 that align with cover mounting threads of standard toggle switch assembly 206, and two fastening devices, sized and shaped for placement through the two holes, respectively, and for engaging the mounting threads of standard toggle switch assembly 206 to secure remote controlled switch cover assembly 100 to standard toggle switch assembly 206. Installation of light switch cover assembly 100 is as easy as installing batteries into main body 200, and replacing the standard toggle switch cover of standard toggle switch assembly 206 with light switch cover assembly 100. In one embodiment, a toggle cover 216 may be used for placement over toggle light switch member 204 which is available to users of remote light switch cover assembly 100 to manually operate light switch cover assembly 100.

Figure 3:
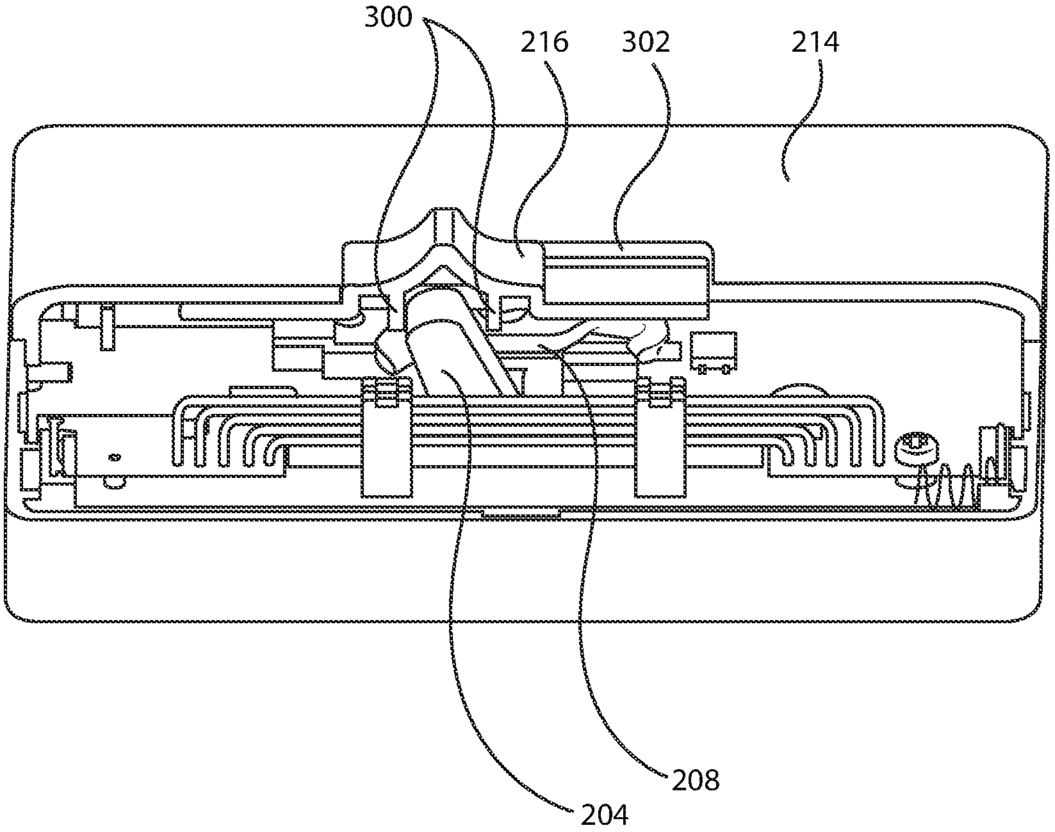
FIG. 3 illustrates a side, cutaway view of one embodiment of remote light switch cover assembly, installed over an existing, standard toggle switch assembly.

FIG. 3 illustrates a side, cutaway view of one embodiment of remote light switch cover assembly 100, installed over an existing, standard toggle switch assembly 206. As shown, toggle cover 216 is slidably seated between toggle light switch member 204 and custom switch cover 214. Two prongs 300 extend downward from toggle cover 216, spaced far apart enough to allow toggle light switch member 204 to seat between the prongs 300. In this arrangement, toggle cover 216 may be positioned up and down within cutout 302 of custom switch cover 214, causing toggle light switch member 204 to change state as toggle cover 216 is positioned between an "on" or up position and "off" or down position. In other embodiments, toggle cover 216 is not used, and toggle light switch member 204 protrudes through cutout 302, allowing direct manipulation of toggle light switch member 204 by a user to manually operate standard toggle switch assembly 206.

Figure 4:
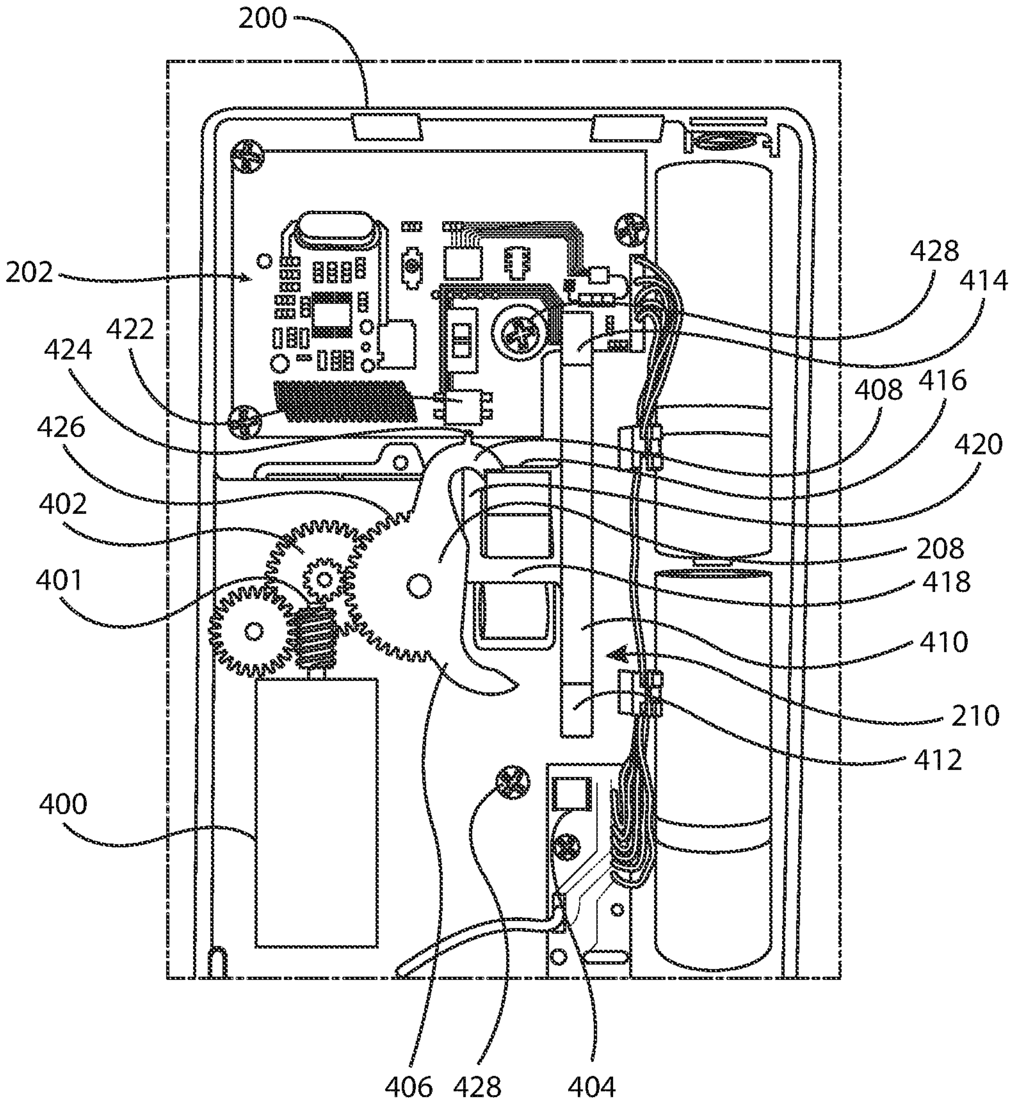
FIG. 4 is a top, plan view of one embodiment of remote controlled switch cover assembly.

FIG. 4 is a top plan view of one embodiment of remote controlled switch cover assembly 100. Shown are main body 200, existing toggle light switch member 204, electric motor 400, motor drive gear 401, gear train 402, toggle position switch 404, switch toggle member 208 comprising a first end 406 and a second end 408, and switch position member 210, among others. Not all of these components are necessary in some embodiments.

Main body 200 may be placed directly over standard toggle switch assembly 206 after its existing switch cover has been removed, with toggle light switch member 204 in either an up or down position. In FIG. 4, toggle light switch member 204 is shown as being in the "up" position, which for discussion purposes, represents the "on" position. Main body 200 is secured to standard toggle switch assembly 206 via two screws 428 that are sized, shaped and spaced to standard-sized threaded cover mounting holes typically found on standard toggle switch assemblies.

After remote controlled switch cover assembly 100 has been installed over standard toggle switch assembly 206, second end 408 of switch toggle member 208 is situated just above an upper surface of toggle light switch member 204 when toggle light switch member 204 is in an "on" or "up" position, as shown. Alternatively, remote controlled switch cover assembly 100 could be placed over standard toggle switch assembly 206 when toggle light switch member 204 is in an "off" or "down" position. Referring back to FIG. 4, switch position member 210 is shown having a longitudinal member 410 with ends 412 and 414 located at opposing ends of longitudinal member 410, an upper horizontal member 416 and a lower horizontal member 418. In one embodiment, distal ends of upper horizontal member 416 and lower horizontal member 418 are joined together by vertical member 420, forming a square frame through which toggle light switch member 204 is placed therethrough.

In the position shown in FIG. 4, end 412 is situated away from position switch 404, causing position switch 404 to be in a first condition, either "open" or "closed", depending on whether toggle position switch 404 is a normally open switch or a normally closed switch. Toggle position switch 404 changes state as end 412 comes into contact with toggle position switch 404 when toggle light switch member 204 is placed into the "off" position. Toggle position switch 404, thus, is used to determine the position of toggle light switch member 204 to be in an off position. In another embodiment, a second toggle position switch (not shown) may be located under end 414 when toggle light switch member 204 is in the "on" position. In this embodiment, one or both toggle position switches may be used to determine the position of toggle light switch member 204. If only one position switch is used, it may be inferred that standard toggle switch assembly 206 is in an on or off condition when the one position switch is activated and in an opposite condition when the one position switch is deactivated. In one embodiment, signals from one or both switches are used by processing circuitry 202 to determine when toggle light switch member 204 has been placed into one position or the other, in order to stop rotation of motor 400, as will be explained later herein.

One of the benefits of remote controlled switch cover assembly 100 is the ability to allow manual manipulation of toggle light switch member 204 by a user without damaging various components of remote controlled switch cover assembly 100, such as gear train 402, motor 400 or switch toggle member 208. As shown in FIG. 4, switch toggle member 208 resides in a "neutral position" after moving toggle light switch member 204 to an "on" or "off" position remotely. This position allows a user to manually turn toggle light switch member 204 to an opposite position without interference from moving switch toggle member 208. Referring to FIG. 4, when a user manually turns toggle light switch member 204 off, toggle light switch member 204 does not move switch toggle member 208 due to the distance between first end 406 and second end 408 being spaced far apart enough to allow unfettered travel of toggle light switch member 204. The neutral position refers to a position of switch toggle member 208 approximately midway to toggle light switch member 204, approximated by a position of lower horizontal member 418. In other words, the neutral position refers to a position of switch toggle member 208 that allows toggle light switch member 204 to be manually positioned without moving switch toggle member 208.

When remote controlled switch cover assembly 100 is operated remotely (e.g., by receiving a wired or wireless signal from a remote device), switch toggle member 208 is moved by gear train 402 as it is turned by motor drive gear 401 of motor 400. When remotely turning toggle light switch member 204 off, motor 400 is energized to turn gear train 402 in one direction, causing switch toggle member 208 to rotate in a clockwise direction, causing second end 408 to push down against the top surface of toggle light switch member 204 until either switch toggle member 208 is moved a predetermined distance to cause toggle light switch member 204 to change to the off position or until toggle position switch 404 changes state when end 412 contacts toggle position switch 404 when toggle light switch member 204 has moved to the off position. In other embodiments, switch toggle member 208 may be configured to move linearly up and down to operate on toggle light switch member 204, rather than rotationally as shown in the embodiment of FIG. 4. Rotation of switch toggle member 208 occurs as a result of teeth 426, formed onto a concave edge of switch toggle member 208, meshing with one of the gears of gear train 402, and turns as gear train 402 is rotated as a result of motor 400 and motor drive gear 401 operating on gear train 402.

Figure 5A:
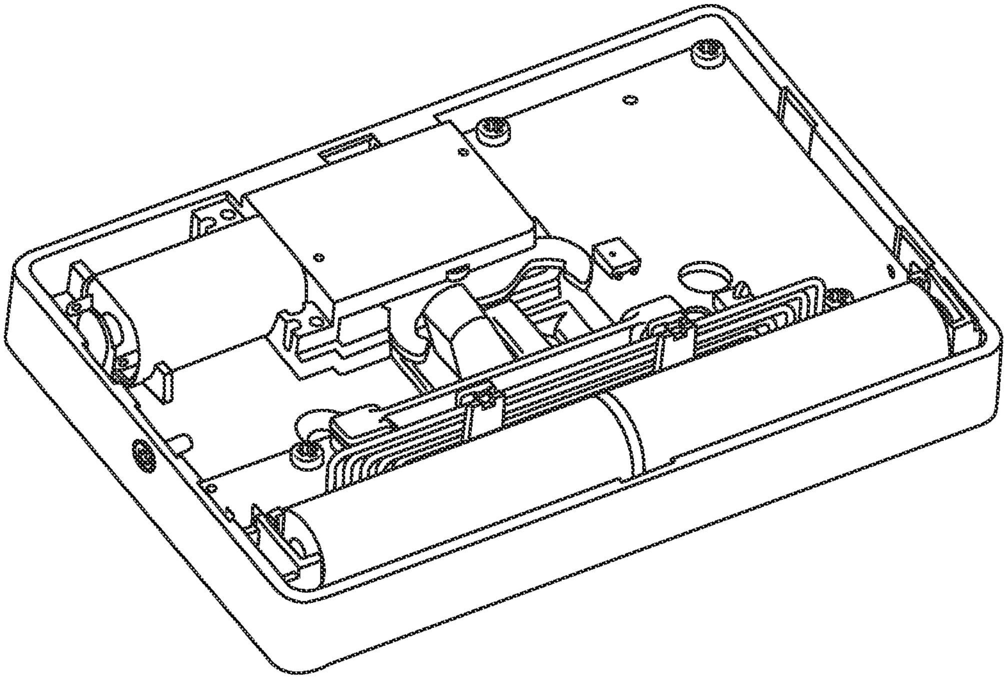
FIG. 5*a* is a perspective view of the remote controlled switch cover assembly shown in FIGS. 1-4, showing a switch toggle member in a neutral position.

After switch toggle member 208 has placed toggle light switch member 204 into the off position, motor 400 begins turning the opposite direction, causing switch toggle member 208 to rotate counter-clockwise back to the neutral position, shown in FIG. 5*a*, with first end 406 resting against or near a lower surface of toggle light switch member 204.

Remote operation of remote controlled switch cover assembly 100 occurs when a user wishes to remotely manipulate toggle light switch member 204 to turn lights on or off for example, using a device which sends wireless signals to a receiver located on or within main body 200, such as a keyfob, smartphone, tablet, home automation gateway, security panel, etc. A receiver as part of electronics 202, or a separate receiver, receives wireless or wired signals from the device and provides the signals to circuitry that controls motor 400, and therefore motion of switch toggle member 208, in order to manipulate toggle light switch member 204 to the "on" or "off" state. For example, when a command is received from a remote device instructing remote controlled switch cover assembly 100 to turn lights on, the receiver receives the wireless signal from the device and provides a downconverted baseband signal to motor control circuitry, such as a electronic circuit and/or discreet components such as one or more transistors, capacitors, resistors, etc. and power circuitry capable of rotating motor 400. The power circuitry then provides a power signal to electric motor 400, typically a low-power DC motor, which causes electric motor 400 to rotate in a first direction, which in turn causes motor drive gear 401 to turn in a first direction. Motor drive gear 401 is in mechanical communication with gear train 402, which comprises a gear ratio that effectively reduces the speed of electric motor to a lower speed for use in moving switch toggle member 208. Gear train 402 is in mechanical communication with switch toggle member 208 via teeth 426, which causes switch toggle member 208 rotate in a first direction, causing toggle light switch member 204 to move to either the on or off position. In one embodiment, the motor control circuitry receives a signal from toggle position switch 404 when switch toggle member 208 has moved far enough to cause standard toggle switch assembly 206 to change state. In other embodiments, the number of rotations of motor drive gear are counted or a rotational position of one or more gears of gear train 402 are determined to indicate that standard toggle switch assembly 206 has been placed in a different state. At that point, motor control circuitry causes motor 400 to rotate in a second direction opposite of the first direction, which in turn causes motor drive gear 401 to turn in a second direction opposite of the first direction, causing switch toggle member 208 to rotate back to the neutral position. Electronics 202 determines when switch toggle member 208 is in the neutral position when it receives a signal from position switch 422, which changes state when second end 408 comes into contact with position switch 422. In one embodiment, second end 408 comprises an extension 424 which makes contact with position switch 422. In general, electronics 202 receives a signal from a sensor of some kind when switch toggle member 208 is in the neutral state.

Determination of when toggle light switch member 204 has been placed into either the "on" or "off" position may be accomplished in a number of different ways. In one embodiment, one or more gear hubs of the gears of gear train 402 could comprise one or more deformities, for example knobs or cams, that may interact with a position switch similar to position switches 422 or 404 as described in U.S. patent application Ser. No. 14/825,117, owned by the applicant of the present disclosure, the entire contents of which are incorporated herein. The deformities are located on the hub(s) at such points to coincide with a desired limit of movement of switch toggle member 208, either up or down, as well as a point indicative of the neutral position.

Remote controlled switch cover assembly 100 may additionally comprise means to transmit information to a remote location, such as a home security panel, home automation system, smartphone, tablet, or some other device. The means may form a portion of electronics 202. The type of information that may be transmitted may comprise the state of toggle light switch member 204 (e.g., "on" or "off", "up" or "down"), battery status (e.g., warning signal sent when battery is low), supervisory signal to indicate the presence and operational confirmation of remote controlled switch cover assembly 100, and/or a signal indicative of detected movement, e.g., by a motion sensor (not shown) optionally integrated into remote controlled switch cover assembly 100. In this embodiment, the circuitry may provide information for transmission to a transmitter located within main body 200. In another embodiment, the transceiver is part of a transceiver/receiver combination, such as one of a variety of transceivers widely available in the marketplace today. Further, the circuitry may provide one or more types of information periodically, such as once per hour, or upon receipt of a command from a remote device to provide one or more types of information.

When used in conjunction with a motion sensor, for example an integrated PIR detector, the remote controlled switch cover assembly may automatically turn lights on or off when people enter or leave a room. When the motion sensor detects movement, indicative of activity in a room, the motion sensor may provide a signal to the circuitry, indicative of such. In response, the circuitry may cause electronic motor 400 to rotate in order to place toggle light switch member 204 into the "on" position. Similarly, if the motion sensor does not detect movement in the room for more than a predetermined time period, such as 10 minutes, the circuitry may cause the electric motor to rotate to turn toggle light switch member 204 to the "off" position.

In a related embodiment, the remote controlled switch cover assembly may turn toggle light switch member 204 on or off as a result of receiving a signal from a remote device, indicative of when activity is detected in a room. For example, a stand-alone motion sensor could sense motion in a room, and then report that finding to a home security panel. The home security panel might then transmit a command to remote controlled switch cover assembly 100 to turn toggle light switch member 204 to the "on" position. In one embodiment, the stand-alone motion sensor is located in one room (such as a foyer) and remote controlled switch cover assembly 100 is located in another room, such as a living room, so that when the motion sensor detects movement, the home security panel can send a signal to remote controlled switch cover assembly 100 in the living room, so that the living room is lit, for example, when a person enters his/her home.

In another embodiment, remote controlled switch cover assembly 100 could be used in conjunction with a typical, manually operated light switch, such as in an application where hallway lighting is controlled by two switches, one located at each end of the hallway. This may be referred to by those skilled in the art as a "three-way circuit". In this embodiment, remote controlled switch cover assembly 100 could transmit a status signal to a remote device such as a home security panel, home automation system, or internet gateway, with a light status of whether the hall light is "on" or "off". Such a determination may be made using a current-sensing device, such as a coil, integrated circuit, and/or other circuitry to sense current flowing through toggle light switch member 204 in conjunction with a known position of toggle light switch member 204 detected by toggle position switch 404. A storage device, such as an electronic memory, flip-flop, or discrete circuitry can be used to store the position of toggle light switch member 204, e.g., either "up" or "down". The same storage device, or a different one, may store the light status as well using the current sensor. Thus, at any time, remote controlled switch cover assembly 100 knows which position toggle light switch member 204 is in currently and whether the light is on or off. Then, if a command is received to either turn the light on or off from the device, the circuitry can determine whether switch toggle member 208 must be activated and, if so, what direction to move switch toggle member 208, depending on whether the command is to turn the light on or off and what position toggle light switch member 204 is currently in. For example, in a three-way application that uses a regular switch and remote controlled switch cover assembly 100, if toggle light switch member 204 is in an "up" position and the current sensor determines that current is flowing through toggle light switch member 204, an indication may be stored within the memory(ies), indicating that toggle light switch member 204 is in the "up" position and that the light is on. Thereafter, if the regular light switch is manipulated, turning the light off, the current sensor detects the loss of current, and the circuitry stores the current status of the light, i.e., "off" in the memory. Then, if a command is received by remote controlled switch cover assembly 100 to turn the light on, the circuitry may read the memor(ies) to determine the present light status and know that the light is off, and that toggle light switch member 204 is in the "up" position. Knowing this, circuitry 202 provides a signal to motor 400 to turn the motor drive gear in a way that will turn cause switch toggle member 208 to move in a direction to place toggle light switch member 204 into an opposite position, in this example, in the "down" position.

Figure 5B:
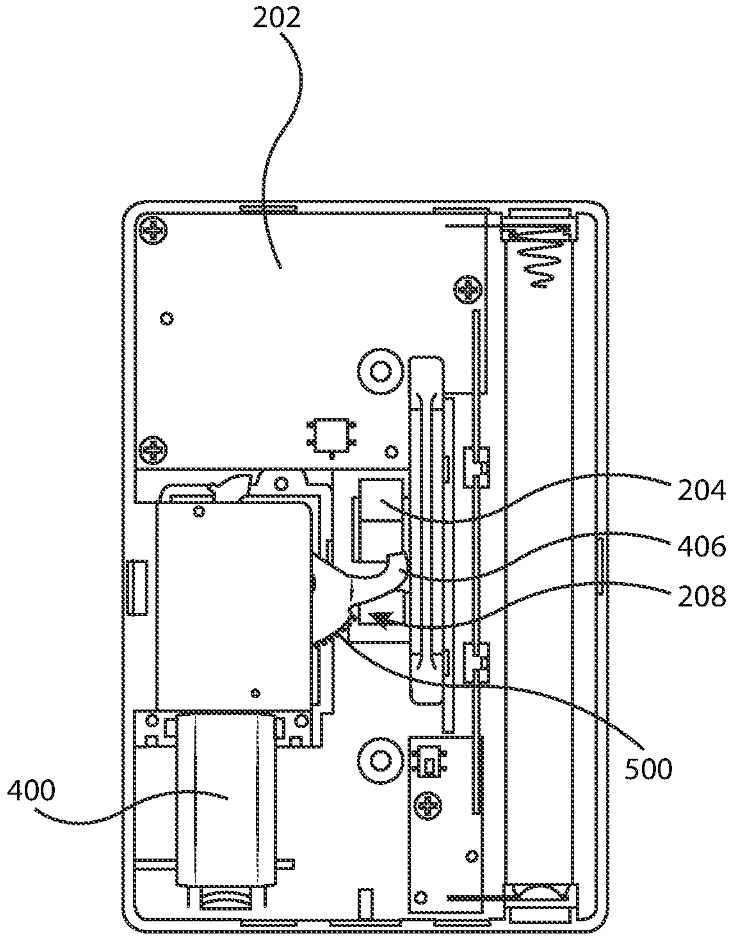
FIG. 5*b* is a top, plan view of the remote controlled switch cover assembly shown in FIG. 5*a*, showing the switch toggle member rotated counter-clockwise from the neutral position.

FIG. 5*b* is a top, plan view of remote controlled switch cover assembly 100 showing switch toggle member 208 rotated counter-clockwise from the neutral position where it has just positioned toggle light switch member 204 into the "on" or "up" position. First end 406 is shown resting against a lower surface of toggle light switch member 204.

Figure 5C:
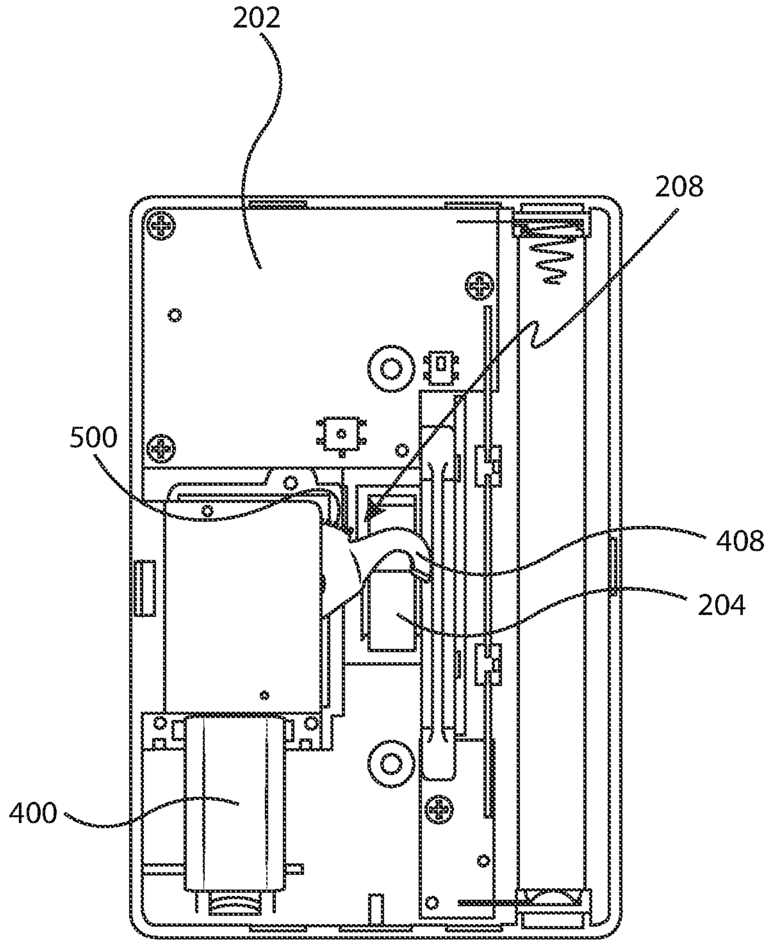
FIG. 5*c* is a top, plan view of the remote controlled switch cover assembly shown in FIG. 5*a*, showing the switch toggle member rotated clockwise from the neutral position.

Conversely, FIG. 5*c* is a top, plan view of the same embodiment of remote controlled switch cover assembly 100 as shown in FIG. 5*b*, showing switch toggle member 208 rotated clockwise from the neutral position where it has just positioned toggle light switch member 204 into the "off" or "down" position. Second end 408 is shown resting against an upper surface of toggle light switch member 204.

Figure 6:
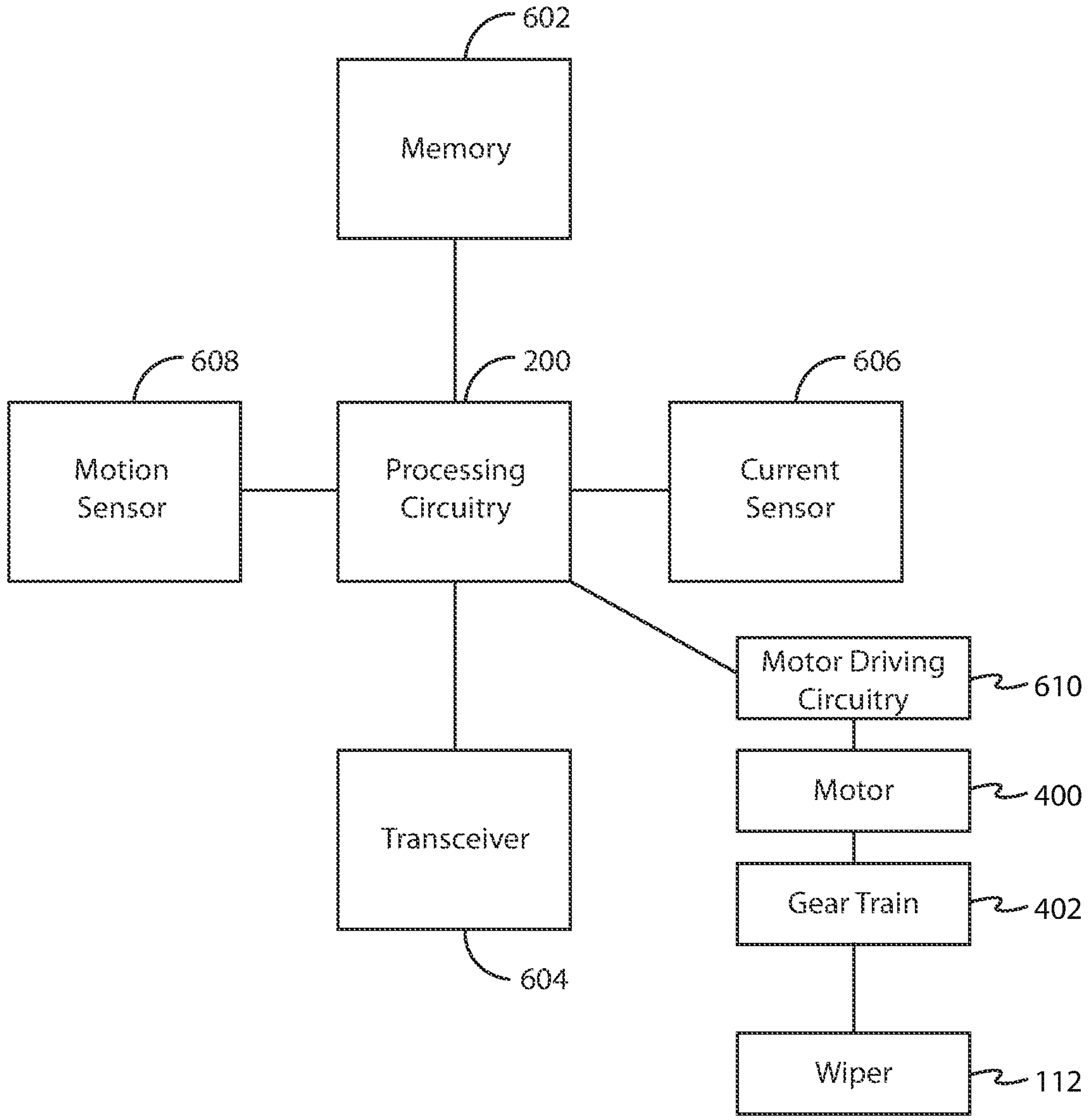
FIG. 6 illustrates a functional block diagram of one embodiment of a remote controlled switch cover assembly in accordance with the teachings herein.

FIG. 6 illustrates a functional block diagram of one embodiment of remote controlled switch cover assembly 100, shown comprising processing circuitry 200, memory 602, transceiver 604, electric motor 400, gear train 402, switch toggle member 208, current sensor 606, motion sensor 608, and motor driving circuitry 610. It should be understood that in some embodiments, not all of the functional blocks shown in FIG. 6 are necessary for the proper operation of the remote controlled switch cover assembly 100 and that some functionality has been omitted for purposes of clarity.

The processing circuitry 200 comprises a general-purpose microelectronic circuit, microcontroller or microcomputer, well known in the art and/or a custom or semi-custom ASIC, and/or discrete components able to carry out the functionality required for operation of remote controlled switch cover assembly 100. Processing circuitry 200 is selected based on power-consumption properties and space considerations, as remote controlled switch cover assembly 100 typically operates on batteries and a small form factor is desirable. In the case of a microelectronic circuit, microcontroller, microcomputer or ASIC, processing circuitry 200 generally executes electronic circuit-executable instructions stored in one or more memories 602 that control the functionality of remote controlled switch cover assembly 100. Examples of memory 602 include one or more electronic memories such as RAM, ROM, flash memory, EEPROMs, UVPROMs, etc. or virtually any other type of electronic, optical, or mechanical memory device, but excludes propagated signals. Memory 602 could alternatively comprise an integrated circuit, such as a flip-flop, or even discrete components, such as one or more transistors, resistors, capacitors, etc.

Transceiver 604 comprises circuitry necessary to transmit and receive communication signals, including messages, commands, status information, requests, etc., between remote controlled switch cover assembly 100 and one or more remote devices such as wireless phones, mobile computers and tablet computers, wearable devices, etc., either directly or through a local device such as a gateway, security panel, or home automation panel. Such circuitry is well known in the art and may comprise BlueTooth, Wi-Fi, RF, optical, or ultrasonic circuitry, among others.

Motion sensor 608 comprises any device that is able to detect movement of a person within range of remote controlled switch cover assembly 100. In one embodiment, a PIR detector is used, although other types of motion sensors may be used in the alternative, keeping the low power requirement of remote controlled switch cover assembly 100 in mind. In another embodiment, motion sensor 608 comprises a passive infrared sensor. In other embodiments, motion sensor 608 may comprise a light-beam interruption detector, a sonic transducer, a reed switch or a pressure sensitive floor device.

Current sensor 606 comprises a device to detect the presence of alternating current that is conducted through toggle light switch member 204. Typically, current sensor 606 comprises a coil, integrated circuit, and/or discrete components to wirelessly determine changes in flux occurring as a result of a change in current through toggle light switch member 204. Current sensor 606 provides a signal indicative of the current to the processing circuitry 200.

The motor driving circuitry 610 is coupled to processing circuitry 200 and provides one or more relatively high power signals to motor 400 that cause motor 400 to rotate in one direction or the other. Such circuitry is well-known in the art.

Figure 7:
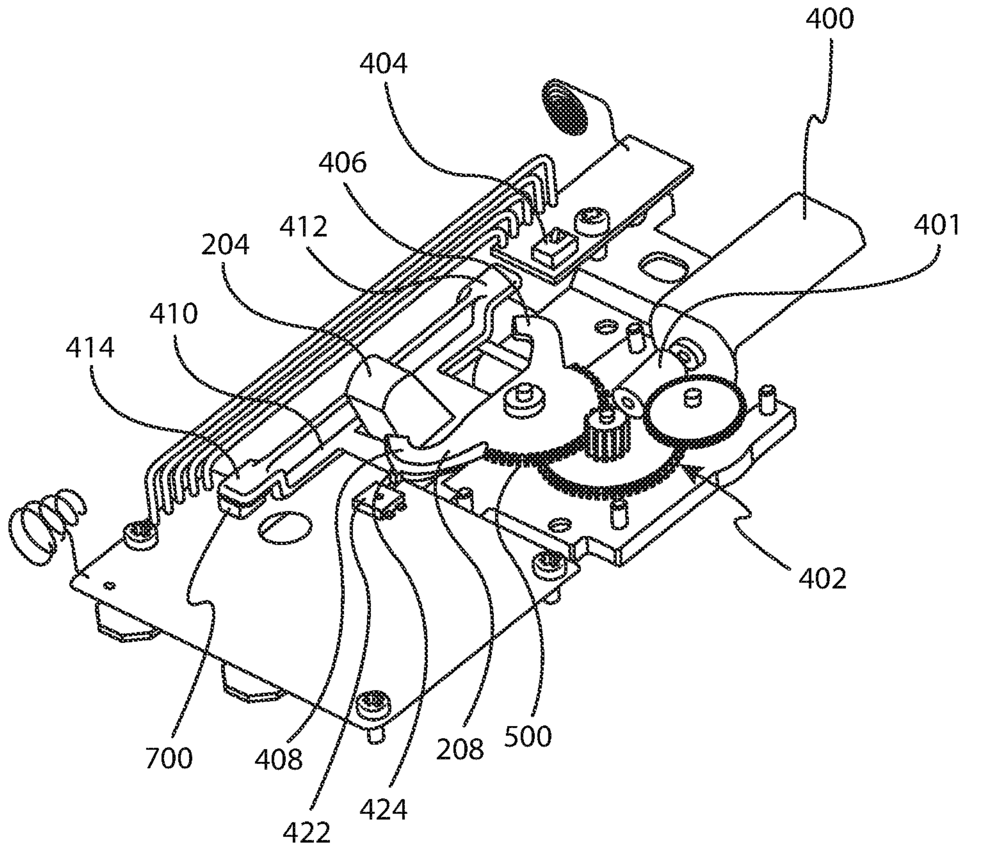
FIG. 7 is a perspective view of the remote controlled switch cover assembly as shown in FIGS. 1-6, with the toggle light switch member in an "on" position, with switch the switch toggle member in the neutral position.

FIG. 7 is a perspective view of the embodiment of remote controlled switch cover assembly 100 as shown in FIGS. 1-6. This view shows toggle light switch member 204 in an "on" position, with switch toggle member 208 shown in the neutral position. In this embodiment, position switch 700 provides a signal to processing circuitry 200 when toggle light switch member 204 is in the "on" position, e.g., as end 414 contacts position switch 700 via movement of toggle light switch member 204 to the "on" position by switch toggle member 208.

Figure 8:
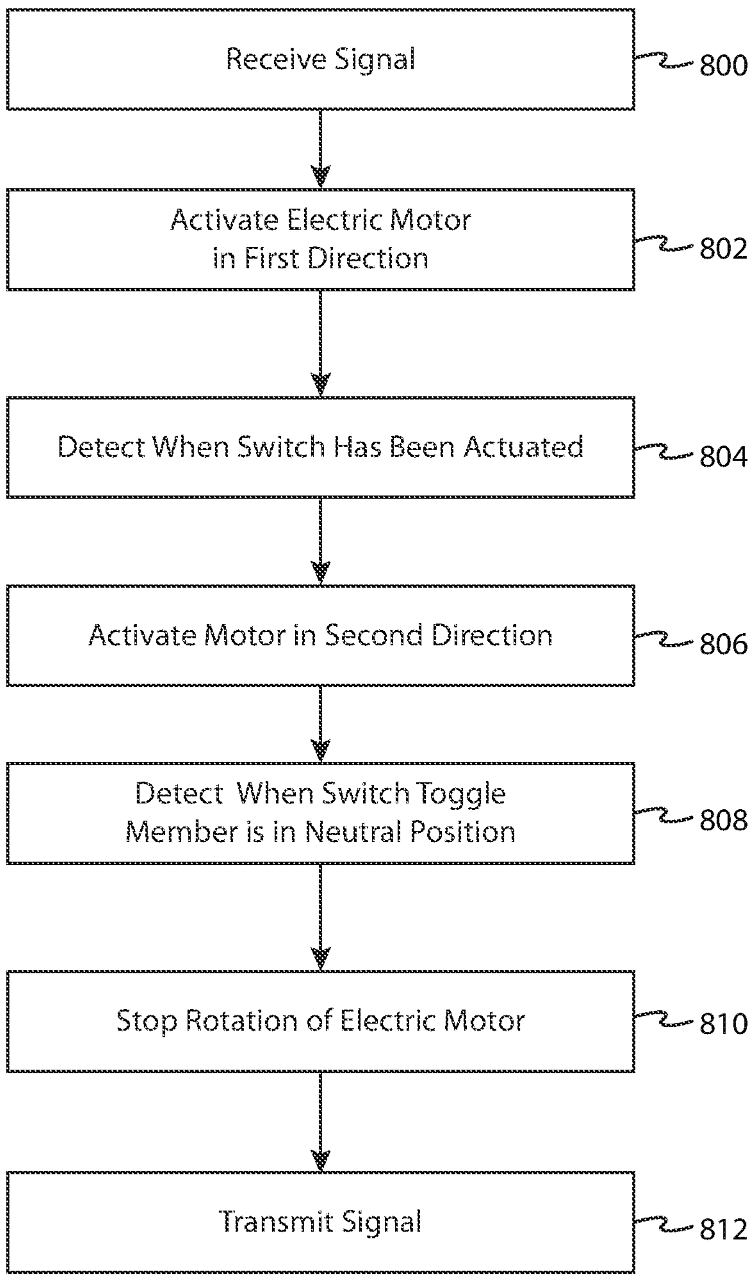
FIG. 8 is a flow diagram of one embodiment of a method for remote control of a standard toggle switch performed by the remote controlled switch cover assembly shown in FIGS. 1-8, in accordance with the teachings herein.

FIG. 8 is a flow diagram of one embodiment of a method for remote control of a standard toggle switch performed by remote controlled switch cover assembly 100 in accordance with the teachings herein. It should be understood that the steps described below could be performed in a different order, or comprise a greater or fewer number of steps in other embodiments, and that some minor method steps have been omitted for clarity.

At block 800, transceiver 604 (or a receiver in an embodiment where a transmitter is not used) receives a wired or wireless signal to actuate switch toggle member 208, to turn lights on or off, for example. The wired or wireless signal may originate from a smart phone, mobile computer, fixed computer, home automation gateway, security system, or some other device known in the art. The signal may comprise a specific instruction to turn a light on or off, or it may comprise an instruction to simply change the state of switch toggle member 208 from its current position to an alternative position.

At block 802, in response to receiving the signal at block 900, processing circuitry 200 activates electric motor 400 that causes gear train 402 to turn in a first direction, commensurate with moving toggle light switch member 204 to a position indicated by the signal (e.g., "on", "off" or "toggle"). In practice, processing circuitry 200 provides a signal to motor driving circuitry 610 which in turn provides a power signal to motor 400. This, in turn, causes gear train 402 to act on switch toggle member 208, causing switch toggle member 208 to move either up or down.

At block 804, processing circuitry 200 detects when switch toggle member 208 has actuated toggle light switch member 204, i.e., when switch toggle member 208 has been placed in either the "on" or "off" position and/or when switch toggle member 208 has activated or deactivated position switch 404. This detection is performed in accordance with the teachings previously discussed above, in some embodiments, using position switch 404 and/or 700.

At block 806, in response to detecting when switch toggle member 208 has been placed in either the "on" or "off" position and/or when switch toggle member 208 has activated or deactivated position switch 404, processing circuitry 200 causes electric motor 400 to rotate in a reverse direction (again, by providing a signal to motor driving circuitry 610) from the first direction, which causes switch toggle member 208 to reverse direction and move back towards the neutral position.

At block 808, processing circuitry 200 detects when switch toggle member 208 is in the neutral position, as previously discussed above. In one embodiment, a signal is provided by position switch 422 as extension 424 contacts position switch 422.

At block 810, in response to detecting when switch toggle member 208 is in the neutral position, processing circuitry 200 causes the electric motor to stop rotating (by sending a signal to motor driving circuitry 610), causing switch toggle member 208 to cease movement.

At block 812, processing circuitry may cause a signal to be transmitted via transceiver 604 to a remote location, such as a security panel, home automation gateway, smart phone, mobile computing device, etc., indicating the position of toggle light switch member 204, e.g. either "on" or "off".

The methods or steps described in connection with the embodiments disclosed herein may be embodied directly in hardware or embodied in machine-readable instructions executed by a electronic circuit, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the electronic circuit such that the electronic circuit can read information from, and write information to, the storage medium. In the alternative, the storage medium may be integral to the electronic circuit. The electronic circuit and the storage medium may reside in an ASIC. In the alternative, the electronic circuit and the storage medium may reside as discrete components.

Accordingly, an embodiment of the invention may comprise a non-transitory electronic circuit-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method performed by a light switch cover, the light switch cover converting a standard toggle switch into a remote-controlled toggle switch, comprising:

receiving, by an electronic circuit via a receiver coupled to the electronic circuit, a wireless signal from a remote device to toggle the standard toggle switch;

in response to receiving the wireless signal, actuating a switch toggle member to rotate in a first direction against a toggle light switch member of the standard toggle switch, placing the toggle light switch member into an on position; and placing the toggle light switch member into an off position via manual manipulation of a toggle cover of the light switch cover;

wherein the first direction is determined based upon a condition of a further, standard toggle switch electrically coupled to the standard toggle switch.

2. The method of claim 1, wherein placing the toggle light switch member into an off position via manual manipulation comprises placing the toggle light switch member into the off position without contacting the switch toggle member.

3. The method of claim 1, further comprising:

determining, by an electronic circuit of the light switch cover, that the toggle light switch member has been moved to the on position; and in response to determining that the toggle light switch member has been moved to the on position, causing, by the electronic circuit, the switch toggle member to rotate in a second direction opposite to the first direction.

4. The method of claim 3, further comprising:

determining, by the electronic circuit, when the switch toggle member has reached a neutral position; and in response to detecting when switch toggle member has reached the neutral position, causing, by the electronic circuit, the electric motor to stop rotating.

5. The method of claim 4, wherein determining when the switch toggle member has reached the neutral position comprises receiving a signal, by the electronic circuit, from a limit switch that is activated when a first portion of the switch toggle member has contacted the limit switch.

6. The method of claim 5, wherein the first portion comprises a deformity located on a hub of the switch toggle member.

7. The method of claim 1, further comprising:

transmitting, by the electronic circuit via a transmitter coupled to the electronic circuit, a signal to a remote location indicating that the standard toggle switch has been moved to the on position.

8. The method of claim 1, wherein determining that the standard toggle switch has been moved to the on position comprises:

receiving a signal, by the electronic circuit, from a limit switch in response to a first end of a switch position member making contact with the limit switch.

9. The method of claim 1, wherein determining that the standard toggle switch has been moved to the on position comprises:

receiving a signal, by the electronic circuit, from a limit switch that is activated when a deformity located on a hub of the switch toggle member has contacted the limit switch.

10. The method of claim 1, wherein determining that the standard toggle switch has been moved to the on position comprises:

receiving a signal, by the electronic circuit, from a limit switch that is activated when a first portion of the switch toggle member has contacted the limit switch.

11. The method of claim 9, wherein the first portion comprises a deformity located on a hub of the switch toggle member.

12. A light switch cover for converting a standard toggle switch into a remote-controlled toggle switch, comprising:

a switch toggle member moveable in a first direction for actuating a toggle light switch member in response to a wireless command received by the light switch cover, the switch toggle member configured to additionally allow manual operation of the toggle light switch member;

two holes formed through a surface of a main body of the light switch cover that align with cover mounting threads of the standard toggle switch; and two fastening devices, sized and shaped for placement through the two holes, respectively, for engaging the mounting threads of the standard toggle switch to secure the light switch cover to the standard toggle switch;

wherein the light switch cover determines the first direction based upon a condition of a further, standard toggle switch electrically coupled to the standard toggle switch.

13. The light switch cover of claim 12, wherein the switch toggle member is configured to allow manual activation of the toggle light switch member without contacting the switch toggle member.

14. The light switch cover of claim 12, further comprising:

an electric motor coupled to the switch toggle member via a gear train, that causes the switch toggle member to rotate in one of the first direction and a second, opposite direction to the first direction;

motor driving circuitry coupled to the electric motor;

a receiver for receiving the wireless command; and processing circuitry coupled to the receiver and the motor driving circuitry that causes the light switch cover to receive the wireless command.

15. The light switch cover of claim 14, wherein the processing circuitry further causes the switch toggle member to return to a neutral position after the toggle light switch member has been placed into an on position.

16. The light switch cover of claim 15, wherein the switch toggle member comprises a deformation, the light switch cover further comprising:

a limit switch;

wherein the processing circuitry determines that the switch toggle member has been placed into the neutral position when the processing circuitry receives a signal from the limit switch in response to the deformation making contact with the limit switch.

17. The light switch cover of claim 12, wherein the switch toggle member comprises a first portion for contacting an underside of the toggle light switch member and a second, opposing end for contacting an upperside of the toggle light switch member, wherein the distance between the first portion and the second portion is sized to allow the toggle light switch member to be operated manually without contacting the first portion or the second portion.

18. The light switch cover of claim 15, further comprising:

a switch position member comprising a first end and an opposing second end; and a limit switch;

wherein the processing circuitry determines that the standard toggle switch has been placed into the on position when the processing circuitry receives a signal from the limit switch in response to the first end of the switch position member making contact with the limit switch.

19. The light switch cover of claim 12, wherein the switch toggle member comprises a curved, toothed portion with a first end portion extending in a first direction therefrom, and a second end portion extending in a second direction opposite to the first direction;

wherein the first end portion pushes against an underside of the toggle light switch member as the gear train acts on the curved, toothed portion while the gear train is rotated in the first direction.

20. The light switch cover of claim 14, further comprising:

a transmitter coupled to the processing circuitry;

wherein the processing circuitry causes the transmitter to transmit a signal to a remote location indicating that the toggle light switch member has been actuated.

21. The light switch cover of claim 12, further comprising a current sensor coupled to the processing device and wherein the current sensor is used to determine the condition of the further, standard toggle switch electrically coupled to the standard toggle switch.

22. The light switch cover of claim 12, further comprising a wireless receiver coupled to the processing device wherein the wireless receiver receives a signal having data that indicates the condition of the further, standard toggle switch electrically coupled to the standard toggle switch.

* * * * *